(12) United States Patent
Witzenberger

(10) Patent No.: US 7,635,036 B2
(45) Date of Patent: Dec. 22, 2009

(54) DEVICE FOR REVERSING THE STEERING MOVEMENT OF A STEERING-WHEEL SHAFT

(75) Inventor: Max Witzenberger, Aindling (DE)

(73) Assignee: RENK Aktiengesellschaft, Augsburg (DE)

( * ) Notice: Subject to any disclaimer, the term of this patent is extended or adjusted under 35 U.S.C. 154(b) by 497 days.

(21) Appl. No.: 11/149,641

(22) Filed: Jun. 10, 2005

(65) Prior Publication Data

US 2006/0027405 A1 Feb. 9, 2006

(30) Foreign Application Priority Data

Jun. 11, 2004 (DE) .................. 10 2004 028 532

(51) Int. Cl.
*B62D 11/00* (2006.01)

(52) U.S. Cl. .................. 180/6.66; 180/6.2; 180/6.7

(58) Field of Classification Search .................. 180/6.2, 180/6.66, 6.7; 280/93.513
See application file for complete search history.

(56) References Cited

U.S. PATENT DOCUMENTS

| | | | | |
|---|---|---|---|---|
| 1,805,536 A * | 5/1931 | White | ................. | 280/775 |
| 3,029,891 A * | 4/1962 | Price | ................. | 180/271 |
| 3,250,142 A * | 5/1966 | Schuster et al. | ................. | 74/336.5 |
| 3,295,620 A * | 1/1967 | Messenger | ................. | 180/6.7 |
| 3,480,156 A * | 11/1969 | Pensa | ................. | 212/289 |
| 3,503,463 A * | 3/1970 | Lestoque | ................. | 180/6.24 |
| 3,604,723 A * | 9/1971 | Daily | ................. | 180/327 |
| 3,687,210 A | 8/1972 | Schaefer | | |
| 3,698,500 A * | 10/1972 | Jernigan | ................. | 180/6.7 |
| 3,776,325 A * | 12/1973 | Jespersen | ................. | 180/6.48 |
| 3,876,033 A * | 4/1975 | Shore | ................. | 180/271 |
| 5,015,221 A * | 5/1991 | Smith | ................. | 475/19 |
| 5,135,427 A * | 8/1992 | Suto et al. | ................. | 446/433 |
| 5,147,008 A * | 9/1992 | Nishimore et al. | ................. | 180/414 |
| 5,285,111 A * | 2/1994 | Sherman | ................. | 290/4 C |
| RE36,151 E * | 3/1999 | Ishino et al. | ................. | 701/50 |
| 5,910,067 A * | 6/1999 | Vandendriessche et al. | ... | 477/92 |
| 6,066,067 A * | 5/2000 | Greenwood | ................. | 476/40 |
| 6,474,426 B2 * | 11/2002 | Yamamoto et al. | ......... | 180/9.44 |
| 6,502,025 B1 * | 12/2002 | Kempen | ................. | 701/41 |
| 2001/0035303 A1 * | 11/2001 | Chatterjea | ................. | 180/6.7 |
| 2002/0096374 A1 * | 7/2002 | Ryan | ................. | 180/6.7 |
| 2004/0226760 A1 * | 11/2004 | Loh et al. | ................. | 180/6.7 |
| 2005/0035601 A1 * | 2/2005 | Dyck et al. | ................. | 290/7 |

FOREIGN PATENT DOCUMENTS

| | | |
|---|---|---|
| DE | 1 780 106 | 12/1971 |
| DE | G 83 08 710.9 | 7/1983 |
| DE | 38 19 446 | 12/1989 |
| DE | 196 37 531 | 3/1998 |

* cited by examiner

*Primary Examiner*—Lesley D Morris
*Assistant Examiner*—Maurice Williams
(74) *Attorney, Agent, or Firm*—Cohen Pontani Lieberman & Pavane LLP

(57) ABSTRACT

A device for reversing the steering movement of a steering-wheel shaft of a vehicle, it being possible to switch the reversal process only at a standstill of the vehicle in a center position of the steering device.

15 Claims, 2 Drawing Sheets

DEVICE FOR REVERSING THE STEERING MOVEMENT OF A STEERING-WHEEL SHAFT

BACKGROUND OF THE INVENTION

1. Field of the Invention

The invention relates to a device for reversing the steering movement of a steering-wheel shaft of a vehicle.

2. Description of the Related Art

Tracked vehicles having track chains, especially rapid tracked vehicles, are usually steered by active steering systems in which further drive movements are superimposed on the main drive movements of the track chains. During forward travel, the superimposed rotational direction of the further drive movements for executing a left turn is oriented forwards on the right-hand chain and is oriented backwards on the left-hand chain.

During travel in the reverse direction, the superimposed rotational directions remain identical without further devices, with the result that the travelled track is reversed. That is to say, unlike in the case of passenger cars or trucks, the vehicle would maintain its rotational direction.

As tracked vehicles make up only a negligibly small percentage of all vehicles, there is often the wish for a tracked vehicle to react in exactly the same way as a wheeled vehicle, that is to say to retain the same track during reverse travel in turns as in forward travel.

DE 38 19 446 C2 discloses an apparatus for switching over steering mechanisms. According to this reference, the superimposed rotational direction of the steering movement of the steering-wheel shaft may be reversed when the direction of travel is changed. A gear wheel which is connected to the steering-wheel shaft drives a forward pinion and a reverse pinion in opposing directions. The forward or reverse pinion can be brought into engagement alternately via a pivoting mechanism with a toothing system on an adjusting element for changeover purposes. The adjusting element is deflected in different directions by the forward pinion and the reverse pinion with the same rotation of the steering wheel and actuates the steering mechanism of the vehicle with the appropriate movement. It is possible to switch over only in the straight-ahead position of the steering system. For this purpose, the pivoting mechanism is locked in its respective switching position by a locking element. In the center position of the steering system, which is set during straight-ahead travel, the locking element can enter a depression on the adjusting element and thus releases the pivoting mechanism for a switchover process.

The disadvantage of this arrangement lies in the electric or hydraulic actuation of the system. Switchover while driving is not prevented if the electric and/or hydraulic changeover system fails.

Furthermore, the vehicle is not prevented from starting to roll counter to the selected driving direction, and thus the incorrectly actuated steering direction is not prevented.

SUMMARY OF THE INVENTION

An object of the invention to provide an operationally reliable device for switching over a steering mechanism, using which device the direction of movement of the steering-wheel shaft can be reversed for travel in the reverse direction.

The object is achieved by a device for reversing the steering movement of a steering-wheel shaft such that the reversing is only possible when the vehicle is at a standstill and with the steering wheel shaft in a center position.

The device according to the present invention thereby avoids all unsafe driving states by evaluation of hydraulic and electrical signals from the change-speed gearbox, a redundant locking of the changeover while driving, and by direct intervention in the change-speed gearbox to prevent the vehicle from starting to roll counter to the desired driving direction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
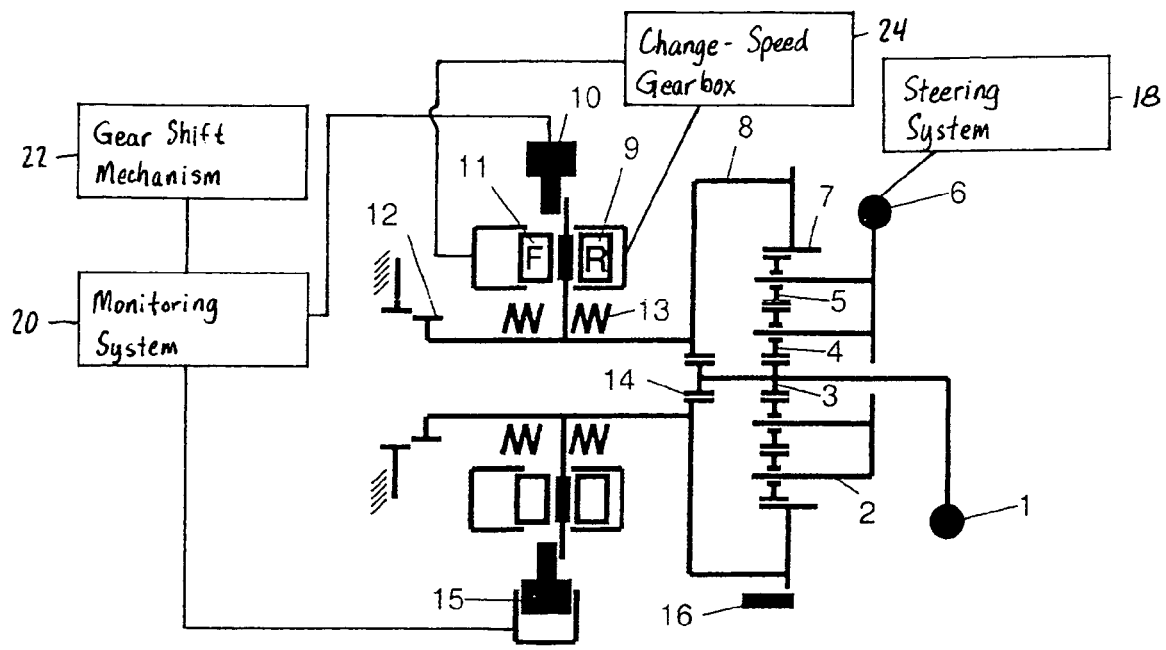
FIG. 1 is a schematic diagram of a device according to the present invention in a switching position for forward travel.

FIG. 1 shows, diagrammatically and by way of example, a device for setting a steering direction which is configured according to the present invention. The driver of a vehicle sets the desired steering direction using the steering wheel 1, the steering direction is transmitted to a steering system 18 of the vehicle by a lever 6. The present invention may be used in tracked vehicles or wheeled vehicles with wheel-based steering. The lever 6 may, for example, interact with steering hydrostatics.

Instead of a hydrostatic solution, various other solutions may be used to generate an infinitely variable or stepped superimposed rotational speed such as mechanical (stepped), electric or hydrodynamic drives and every conceivable combination of the latter. Depending on which solution is implemented on a vehicle, the corresponding element of the respective steering system is actuated by the device according to the present invention.

If there are electric drives or electric or electrohydraulic actuation systems, it is relatively simple to switch over the steering movement of a steering-wheel shaft.

As safety devices are paramount in the case of the steering system, preference is often given, however, to purely mechanical actuation. Thus it is known in active steering systems, for example, to connect the adjustable-angle plate of the hydrostatic motor to the steering handle in a directly mechanical manner, optionally also in a servo-assisted manner.

To avoid unreliable driving states, a changeover in the steering direction must not occur while driving, in particular while turning, even in the case of a power failure. Even if a change in driving direction is selected deliberately while driving, the switchover of the steering direction must not occur. That is, a changeover should preferably take place only at a standstill.

The special case of rotating on the spot is also to be considered for the tracked vehicle, which also represents a driving state during which there should be no switchover.

To allow switching of the steering movement in an operationally reliable manner, a device according to the present invention is installed in the steering linkage. The device can reverse the rotational direction with a double planetary-gear set in the embodiment shown by way of example.

Three switching positions are preferably possible, i.e., forward, reverse and a neutral or transitional position.

The steering wheel 1 is connected via a steering-wheel shaft to a sun gear 3 which interacts with first planetary gears 4 of a double planetary-gear set. Further planetary gears 5 are in engagement with the first planetary gears 4 and simultaneously roll in an internal gear 7. The planetary gears 4, 5 are mounted rotatably in a planetary carrier 2 on which the lever 6 is arranged.

During forward operation of the vehicle (FIG. 1), normal steering is to be carried out. An actuating cylinder for forward travel 11 is preferably switched on the device via the hydraulic actuation of a forward-gear clutch of a change-speed gearbox in the vehicle.

The forward-gear clutch of the vehicle change-speed gearbox is also switched on if, for example, the first and fourth gears are engaged simultaneously in order to lock the change-speed gearbox, or another switching position is selected which corresponds to turning on the spot.

The actuating cylinder for forward travel 11 interacts with a rotatably mounted switching element 8 on which the internal gear 7 and toothing systems 12, 14 are arranged. The actuating cylinder for forward travel 11 displaces the switching element 8 in the axial direction, the toothing system 12 being pulled out of its mating toothing system which is fixed on the housing, and it being possible for the switching element 8 to rotate freely with respect to the housing. A further toothing system 14 is brought into engagement with a corresponding mating toothing system on the steering-wheel shaft by the displacement movement of the actuating cylinder for forward travel 11. The internal-gear toothing 7 remains in engagement with the planetary gears 5 during movement of the switching element 8. In this position of the switching element 8, the sun gear 3 and the internal gear 7 are thus coupled fixedly to one another in terms of rotation, and the steering movement of the steering wheel 1 is transmitted to the lever 6 in the same rotational direction and with the same rotational speed.

Suitable electric gear-shift mechanisms 22 may be implemented to prevent the vehicle from starting to roll counter to the selected driving direction in response to a monitoring system. If the monitoring system 20 detects that the vehicle is moved normally, i.e., in the selected driving direction, the switching element 8 may be locked in its respective end position by two locking devices which operate independently of one another. The use of two independent locking devices rules out desired or undesired switchover processes.

A first locking device 10 such as, for example, an interlock magnet may be actuated electrically as soon as an electrically detectable vehicle speed is reached. A second locking device 15 such as, for example, a hydraulically or pneumatically actuated interlock piston may be switched in response to an oil pressure which is generated by an overrun pump. This oil pressure is generated upon movement of the vehicle.

To additionally prevent switchover in the case of a fault, and to avoid premature switchover in the normal case, the toothing systems 12, 14 are designed such that they can be pushed into one another only in a center position of the steering wheel 1. Switchover is therefore possible in a positive mechanical manner only when travelling straight ahead.

Claw clutches or other form-fitting clutches may also be used instead of toothing systems 12, 14, if the two clutch parts of the former can be coupled to one another only in a single relative rotational position.

Figure 2:
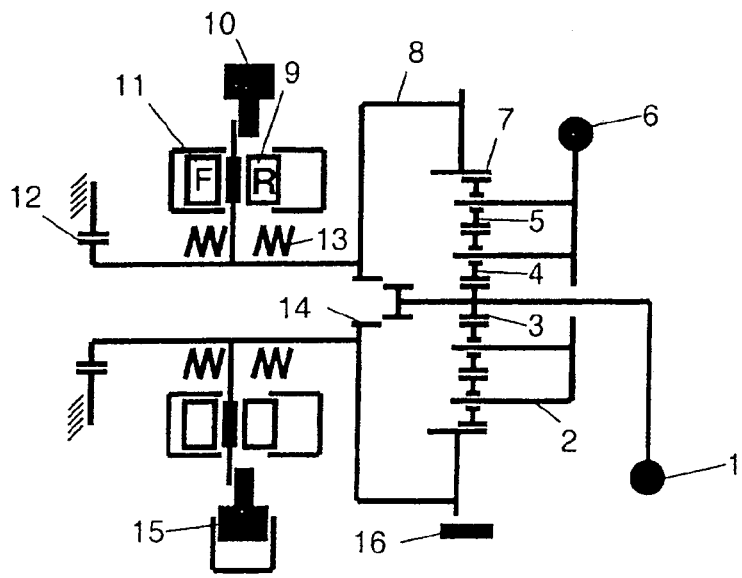
FIG. 2 is a schematic diagram of the device of FIG. 1 in a switching position for reverse travel.

The actuating direction of the steering wheel 1 is to be reversed for reverse travel. For this purpose, an actuating cylinder 9 for reverse travel may preferably be switched in using the hydraulic actuation of a reverse-gear clutch of the change-speed gearbox. FIG. 2 shows the device according to the invention in the "reverse" switching position. The switching element 8 is displaced in the axial direction by the movement of the actuating cylinder 9 such that the toothing system 14 is pulled apart and the toothing system 12 is pushed into engagement. The internal gear 7 further remains in engagement with the planetary gears 5 in the "reverse" switching position. The toothing system of the internal gear 7 is preferably wider than that of the planetary gears 5 for this purpose. As a result of the switching movement to the "reverse" switching position, the internal gear 7 is connected fixedly to the housing in terms of rotation and the sun gear 3 is decoupled from the internal gear 7. The steering movements made by the steering wheel 1 are transmitted by the sun gear 3 and the planetary gears 4, 5, the latter rolling in the internal gear 7 which is fixed on the housing. In the process, the planetary carrier 2 rotates counter to the rotational direction of the steering-wheel shaft. The lever 6 which is connected to the planetary carrier 2 is accordingly also rotated counter to the rotational direction of the steering movement. The transmission ratio of the planetary gear mechanism is preferably configured in such a way that the steering-wheel movement is transmitted at an unchanged rotational speed.

Suitable electric gear-shift mechanisms 22 may be implemented to prevent the vehicle from starting to roll counter to the selected driving direction. If, however, the vehicle is moved in the selected driving direction, the switching element 8 be locked in its end position by the two locking devices 10, 15 which operate independently of one another, as already mentioned, to rule out desired or undesired switchover processes.

Figure 3:
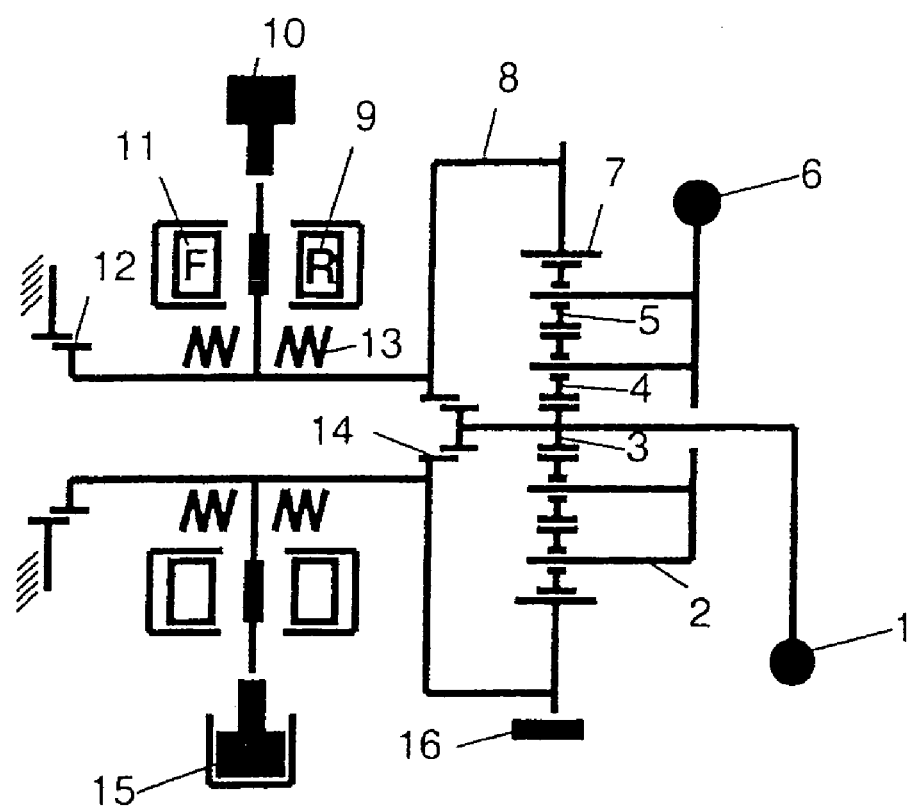
FIG. 3 is a schematic diagram of the device of FIG. 1 in a neutral or transitional position.

FIG. 3 illustrates a "neutral" or transitional switching position. A neutral gear-selection switch position is to be assumed if the appropriate hydraulic signals for the "forward" or "reverse" switching positions are absent. In this case, the locking systems 10, 15 release the switching element 8. Centering of the switching element 8 is effected by springs 13. The center position of the switching element 8 locks every movement of the steering lever 1, because the toothing system 12 on the switching element 8 still engages partially in its mating toothing system which is fixed on the housing and the steering-wheel shaft is at the same time still in engagement with the other toothing system 14. This means that it is not possible to steer in the neutral travel-direction position.

However, there can also be provision for the switching element 8 to be held in a sprung manner in the switching position "Forwards" or "Reverse" if the appropriate signals are absent.

Furthermore, an electric position sensor 16 may be provided for monitoring the system and alarming the driver if, in the case of a fault, the position of the locking devices does not correspond to the conditions which are required for it. Additionally, the electric monitoring system 20 may actuate the gear-shift mechanisms 22 to intervene in the change-speed gearbox to prevent the vehicle from starting to roll erroneously by locking the change-speed gearbox.

In addition to the use of the different hydraulic pressures or the electrical signals which cause the switching of the change-speed gearbox for the activation of the actuating cylinders 9, 11, a manual activation system can also be provided.

Instead of the actuating cylinders, it is also possible for other adjusting devices to be provided.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device switchable from a first position to a second position such that reversal of a steering movement of a steering-wheel shaft of a vehicle occurs upon switching the device from the first position to the second position, the device being arranged so that the switching between the first and second positions is possible only at a standstill of the vehicle and when the steering wheel shaft is in a center position,
    wherein the device is arranged for receiving one of electrical and hydraulic signals from a change-speed gearbox of the vehicle, the switching being initiated in response to said one of electrical and hydraulic signals, and
    said device is movable to an intermediate position when the one of electrical and hydraulic signals are absent, the device locking the steering wheel shaft in the intermediate position.

2. The device of claim 1, wherein the device is switched into the first position associated with forward travel of the vehicle when the one of electrical and hydraulic signals are absent.

3. The device of claim 1, further comprising an interlock for receiving a travelling signal and preventing switching to the intermediate position while the travelling signal indicates that the vehicle is driving, the interlock maintaining the respectively set position of said first and second positions while the travelling signal indicates that the vehicle is driving.

4. The device of claim 3, wherein said travelling signal is one of an electrical and hydraulic signal.

5. The device of claim 4, wherein the travelling signal is a hydraulic signal generated by an overrun pump of the vehicle.

6. The device of claim 1, wherein said device is operatively connected with a gearbox for a tracked vehicle.

7. The device of claim 6, wherein the device is moved to the first position in response to a drive position of the gearbox in the tracked vehicle associated with rotating the vehicle about a vertical axis of the vehicle.

8. The device of claim 1, further comprising an electric monitoring device for monitoring the device and indicating faults to a driver of the vehicle.

9. The device of claim 8, wherein said electric monitoring device is connected to a mechanism arranged for preventing the vehicle from staffing to roll erroneously by locking a change-speed gearbox of the vehicle.

10. A device switchable from a first position to a second position such that reversal of a steering movement of a steering-wheel shaft of a vehicle occurs upon switching the device from the first position to the second position, the device being arranged so that the switching between the first and second positions is possible only at a standstill of the vehicle and when the steering wheel shaft is in a center position, wherein the device comprises
    a planetary gear mechanism for reversing the steering rotational movement, said planetary gear mechanism comprising a sun gear interacting with an internal gear through a double planetary-gear set having a planetary-gear carrier, the steering wheel being connected to said sun gear, said internal gear being fixed on a housing, the planetary-gear carrier rotating counter to the rotational direction of the steering wheel and activating a steering system of the vehicle via a lever.

11. The device of claim 10, further comprising an axially displaceable switching element connected for decoupling said internal gear from the housing in the first switching position so that said internal gear rotates freely and said sun gear is coupled fixedly to the internal gear so that the rotational movement of the steering wheel is transferred to the lever in the same rotational direction.

12. The device of claim 11, further comprising toothing systems or clutches on the switching element for selectively coupling the internal gear fixedly to the housing or to the sun gear in response to the switching position of the device.

13. The device of claim 11, further comprising one of hydraulic, pneumatic and electric actuating means and springs for displacing the switching element.

14. The device of claim 11, further comprising at least one interlock magnet and at least one interlock piston for locking the switching element in one switching position.

15. A device for reversing a steering movement of a steering-wheel shaft of a vehicle, the device being connected to the steering-wheel shaft such that an input steering movement is received and having an output which transmits an output steering movement to a steering system, the device being switchable from a first position, in which the output steering movement is in the same rotational direction as the input steering movement, and a second position, in which the output steering movement is in the opposite rotational direction as the input steering movement, wherein the device is arranged so that switching between the first and second positions is possible only at a standstill of the vehicle and when the steering wheel shaft is in a center position;
    a planetary gear mechanism including a sun gear connected to the steering-wheel shaft, said sun gear interacting with an internal gear through a double planetary-gear set having a planetary carrier the planetary carrier transmitting the output steering movement to the steering system of the vehicle; and
    a switching element connected to said internal gear and displaceable for connecting said internal gear to said sun gear in said first position and connecting said internal gear to a housing in the second position.

* * * * *